United States Patent [19]

Nakazawa

[11] Patent Number: 5,140,143
[45] Date of Patent: Aug. 18, 1992

[54] LASER BEAM BAR CODE READING APPARATUS AND METHOD

[75] Inventor: Atsushi Nakazawa, Osaka, Japan

[73] Assignee: Sumitomo Electric Industries, Ltd., Osaka, Japan

[21] Appl. No.: 784,998

[22] Filed: Oct. 30, 1991

Related U.S. Application Data

[62] Division of Ser. No. 462,535, Jan. 3, 1990.

[30] Foreign Application Priority Data

Jan. 10, 1990 [JP] Japan ...................................... 1-4019

[51] Int. Cl.⁵ .............................................. G06K 7/00
[52] U.S. Cl. ...................................... 235/472; 235/470
[58] Field of Search ........................ 235/462, 470, 472

[56] References Cited

U.S. PATENT DOCUMENTS

| | | | |
|---|---|---|---|
| 3,770,942 | 11/1973 | McMurtry | 235/462 |
| 3,812,374 | 5/1974 | Tuhro | 235/462 |
| 3,985,999 | 10/1976 | Yoneyama | 235/463 |
| 4,013,893 | 3/1977 | Hertig | 235/462 |
| 4,057,784 | 11/1977 | Tafoya | 235/467 |
| 4,460,120 | 7/1984 | Shepard et al. | 235/472 |
| 4,843,222 | 6/1989 | Hochgraf | 235/462 |
| 4,882,476 | 11/1989 | White | 235/462 |
| 5,034,619 | 7/1991 | Hammond, Jr. | 235/462 |

FOREIGN PATENT DOCUMENTS

| | | |
|---|---|---|
| 0092061 | 3/1983 | European Pat. Off. . |
| 0085804 | 8/1983 | European Pat. Off. . |
| 147579 | 7/1987 | Japan ................................... 235/462 |

OTHER PUBLICATIONS

F. Denki Seizo, Optical Reader for Dot Bar Code, vol. 7, Patent Abstracts of Japan, No. 82, Apr. 6, 1983, p. 189 [1227].

*Primary Examiner*—John W. Shepperd
*Attorney, Agent, or Firm*—Cushman, Darby & Cushman

[57] ABSTRACT

A bar code reading arrangement. A laser beam is scanned across a bar code which may be on a remote surface. Two detectors receive light reflected from the bar code, and convert it to an electrical signal. The detectors are laterally spaced on opposite sides of a line defined by the bi-section of the triangular area which is scanned by the laser beam. The electrical signal from the detector receiving only diffusely reflected light is used to identify the content of the bar code. The invention may be practiced in a hand-held unit with trigger means to initiate the bar code reading operation.

7 Claims, 1 Drawing Sheet

LASER BEAM BAR CODE READING APPARATUS AND METHOD

This is a division of application Ser. No. 07/462,535, filed Jan. 3, 1990.

BACKGROUND OF THE INVENTION

This invention relates to bar code readers, and more particularly to a bar code reader for reading, using a laser beam, a bar code on a remote surface.

It has become common practice for sales and inventory control purposes, etc., to print a bar code on the surface of a product which may indicate manufacturer name, product name, price and manufacturing data. The bar code is read, using an optical bar code reader, at appropriate time for obtaining the coded information.

Bar code readers are generally either a so called "standing" type or a "handheld" type. The standing type reads a bar code attached to an object when the object and bar code are passed in front of the bar code reader. In contrast, the handheld type must be brought to the object in order to read the bar code. The pen type bar code reader is the most common example of a handheld bar code reader. The pen type has an optical tip which must be physically drawn across the bar code in order to read it. Another variation of the handheld type is the beam scanning bar code reader which has recently been gaining in popularity. The beam scanning reader includes a frame formed in the shape of a pistol. Inside the frame is a laser beam source for generating a laser beam, a laser beam scanning device for causing the laser beam to scan across a bar code to be read and, a detecting arrangement including beam receiving elements for receiving laser light reflected from the bar code surface. The detecting arrangement converts the reflected light into an electric signal indicative of the amount of light received. Identifying means interprets the electrical signal so as to "read" the bar code information.

A beam scanning system can detect a small spot from a distance, thus it allows the reading of both proximate and remote bar codes. In addition, the beam automatically scans the object so that no touch-and-move operation is required. In contrast, the pen type must have its cylindrical end portion touching the object to read it. The beam scanning bar code reader only requires that the object be held by the hand (for the standing type), or that the bar code be sighted as a target (for the handheld type).

The beam reflected from the bar code surface includes two components: a specularly reflected beam, and a diffusely reflected beam. The amount of light derived from the specularly reflected beam is so intense that changes in the reflected light cannot be differentiated. For this reason, the beam scanning type bar code reader uses the diffusely reflected beam for reading bar codes. However, even in bar code readers which detect the diffusely reflected beam, it often happens that the specularly reflected beam also reaches the beam receiving element during the scanning operation. For example, if black characters or symbols appear on a region which is white, the intensity of the specularly reflected beam from the black characters or symbols becomes greater than that of the diffusely reflected beam from the white region. As a result, the contrast becomes poor and the bar code cannot be read. Thus, there is a "dead angle" below which a bar code cannot be read.

To overcome this problem, one alternative is to provide indirect illumination such as with touch type bar code readers which use charge coupled devices (CCDs). However, another solution must be found for beam scanning bar code readers because direct lighting is required to scan distant bar codes.

Another alternative is to restrict the angle at which the bar code reader is used relative to the bar code (such that the specularly reflected beam cannot reach the receiving element). However, this makes use of the device more inconvenient.

SUMMARY OF THE INVENTION

An object of this invention is to provide a method and apparatus for scanning a bar code with a laser beam and identifying the contents of the bar code solely from diffusely reflected light, without restricting the positional and angular relationship of the bar code reader relative to the bar code, i.e. free from the problem of "dead angle".

To achieve the above object, the present invention provides a method for reading bar codes including the steps of:

generating a beam of laser light;

causing the laser beam to scan across a bar code, the area scanned by said laser beam defined by a triangle with vertices at the point where the laser beam is directed toward the bar code, and on opposite sides of the bar code surface; and receiving laser light reflected from the bar code using dual detectors laterally spaced such that at any point in time, at least one of said detectors is not receiving laser light specularly reflected from a bar code;

These steps ensure that at least one of the detectors will be receiving only diffuse light, and no "dead angle" will occur.

In addition, the present invention provides an apparatus for reading bar codes including:

laser beam source means for generating a beam of laser light;

laser beam scanning means for causing the laser beam to scan across a bar code, said scanning means causing the laser beam to scan across an area defined by a triangle having vertices at the point where the laser beam is directed toward the bar code and on opposite sides of the bar code surface;

detecting means for receiving laser light reflected from the bar code, said detecting means further comprising a first detector for receiving laser light reflected from the bar code, and for converting said light into a first electrical signal corresponding to the amount of laser light received, and a second detector for receiving laser light reflected from the bar code, and for converting said light into a second electrical signal corresponding to the amount of laser light received, the first detector and the second detector being laterally spaced such that, at any point in time, at least one of said detectors is not receiving laser light specularly reflected from a bar code;

switching means for inputting the first electrical signal and the second electrical signal, and for selectively outputting one of said signals to the identification means, said switching means selecting one of said electrical signals outputted from one of said detectors receiving only laser light diffusely reflected from a bar code, and not selecting one of said electrical signals outputted from one of said detectors receiving specularly reflected laser light from a bar code; and identification means for inputting the selected electrical signal, and for identifying the content of a bar code therefrom.

The detecting means is a pair of detectors laterally disposed on opposite sides of a line defined by the bisection of the triangular area over which the laser beam scans, the triangular area having vertices at the point where the laser beam is directed toward the bar code, and on opposite sides of the bar code surface. This ensures that only one of the detectors will receive the specularly reflected beam. The other detector will receive only diffusely reflected light. The output signals from the pair of detectors are evaluated by the switching means to determine which detector is receiving only diffusely reflected light.

The operation of the switching means ensures that only the signal from the diffuse light receiving detector is switched through to the identification means. In this manner the dead angle can be eliminated by switching between the dual detectors, one of which must be receiving only diffusely reflected light.

BRIEF DESCRIPTION OF THE DRAWINGS

Preferred embodiment(s) of the invention will be described in detail with reference to the drawings wherein like reference numerals denote like or corresponding parts throughout.

DETAILED DESCRIPTION OF THE PREFERRED EMBODIMENT

Figure 1:
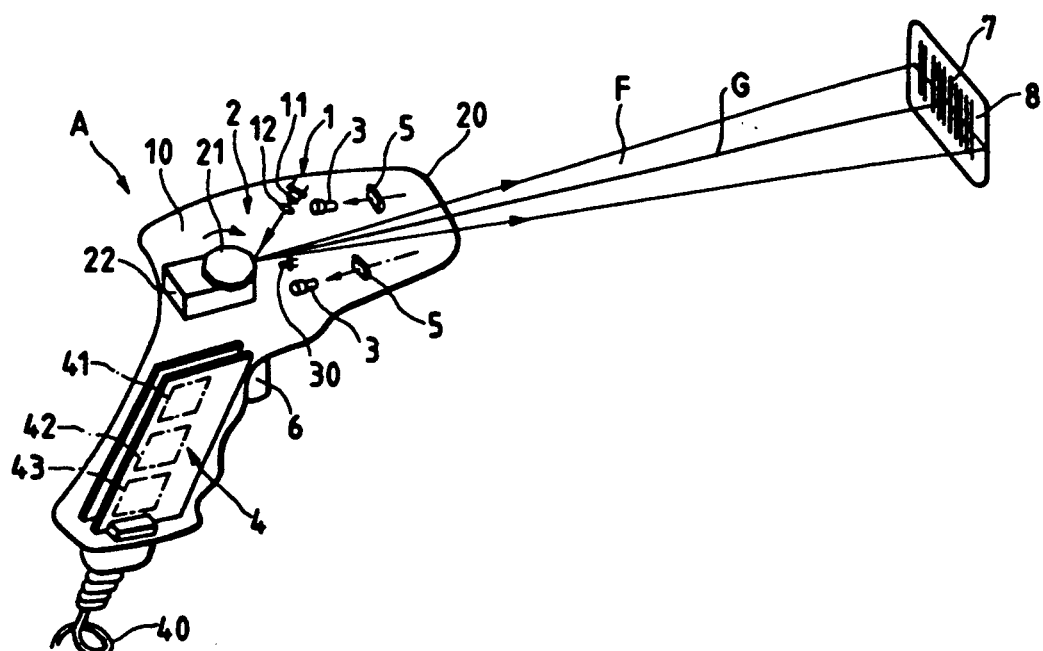
FIG. 1 is a perspective view showing the internal configuration of a bar code reader.

FIG. 1 is a perspective view showing a beam scanned bar code reader A of the handheld type. Bar code reader A includes hand-held package 10 which contains its other components. A laser beam source 1 generates a laser beam. A laser beam scanner 2 causes the laser beam to scan along a bar code 7. A pair of detectors 3, which may be photodiodes or the like, receive a beam reflected from a bar code surface 8 and convert the received beam into an electric signal proportional to the amount of laser light received. A signal processing circuit 4 processes the electrical signal from detectors 3. Processing circuitry includes control means 41, switching means 42 and identifying means 43.

Package 10 is formed in the shape of a pistol. The muzzle of the pistol is provided with an aperture 20 for passing the laser beam and its reflected beam. A signal cord 40 extends from the frame 10 for supplying an output signal from the processing circuit 4 to an external unit. A trigger 6 initiates the bar code reading operation.

The laser beam source 1 includes a laser beam generating element 11 which can be a semiconductor laser element or a laser diode, and a lens 12 for converging the output beam of laser beam generating element 11.

Scanner 2 includes a rotating polygonal mirror 21 for causing the output beam from the laser beam source 1 to horizontally scan over a triangular area F defined by a predetermined angle α, and having vertices at the point where the laser beam is directed toward the bar code by the polygonal mirror, and on opposite sides of the bar code surface. Scanner 2 also includes a motor 22 for rotating the polygon mirror 21. The beam which is reflected by the polygonal mirror 21 is irradiated onto the bar code surface 8.

Detectors 3 are set to a beam receiving level optimal for the intensity of the diffusely reflected beam coming from the bar code surface 8. Detectors 3 are vertically disposed so as to interpose therebetween a line G formed by the bisection of the triangular area F which is scanned by the laser beam. A pair of cylindrical lenses 5 guide the reflected beam from the bar code surface 8 into the detectors 3. A beam receiving element 30 detects the scanning operation by directly receiving the reflected beam from the polygon mirror 21.

Control means 41 controls the driving of the beam source 11 and the motor 22. The switching means 42 determines which of the output signals from the detectors 3 is to be input to the identifying means 43 by selecting only the output signal whose amplitude falls between a predetermined upper and lower threshold value. This switching operation is based on a scanning division signal from the beam receiving element 30 which detects the scanning operation. The identifying means 43 shapes the signal outputted by the detector and obtains data corresponding to the subject bar code by binarycoding the bar code. The contents of the bar code are identified based on this binary coded signal.

When trigger 6 is operated, a laser beam is generated by the laser beam source 1, and, at the same time, mirror 21 is rotated by motor 22. The laser beam is reflected by a surface of the rotating polygonal mirror 22, and is caused to scan across a predetermined angle α which corresponds to the rotation of the reflecting surface. The scanning laser beam travels to the bar code surface 8 through the aperture 20. The beam reflected from the bar code surface 8 is received by the pair of detecting means through the lenses 5.

Figure 2:
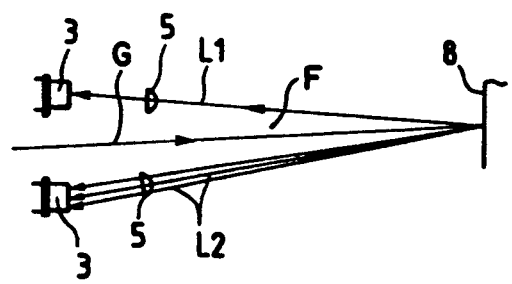
FIG. 2 is a schematic view showing the reflection paths of a laser beam.

As shown in FIG. 2, the pair of detectors 3 are disposed so as to interpose therebetween the line G formed by the bisection of the triangular area F scanned by the laser beam. The specularly reflected beam L1 is reflected to only one of the detectors 3, depending on the angular and positional relationship between the bar code reader A and the bar code surface 8. The other detector 3 receives only the diffusely reflected beam L2. It is always possible for at least one of the detecting means 3 to receive the proper amount of the reflected beam in a scanning operation, regardless of the positional and angular relationship of the bar code reader to the bar code.

Referring back to FIG. 1, the output signal from the detector which is receiving only diffusely reflected light is switched through to the identifying means 43 by the switching means 42, whereby the bar code 7 can be identified based on the proper amount of reflected light.

The specularly reflected beam is received by only one of the two detectors 3, whereby it is ensured that the other detector receives no specularly reflected light. As the laser beam scans across the bar code, the switching means 42 operates to switch an output signal from one detector 3 through to the identifying means. The switching means 42 will only switch through a signal from a detector 3 which is receiving diffusely reflected light. Therefore the bar code can be identified from diffusely reflected light without imposing any positional or angular relationship restrictions on the bar code reader with respect to the bar code.

A further embodiment of the present invention includes a bar code reader of the standing type. In this embodiment, the components of the scanning bar code reader are contained in a stationary package. An object containing a bar code must be held in front of the bar code reader for the scanning operation to occur.

According to the bar code reader of this invention, in which a pair of detectors are disposed so as to interpose therebetween a line formed by the bisection of the triangular area scanned by the laser beam, the bar code can be identified from diffusely reflected light without imposing any positional or angular relationship restrictions on the bar code reader with respect to the bar code.

While the invention has been particularly shown and described with reference to the foregoing preferred embodiments thereof, it will be understood by those skilled in the art that other changes in form and detail may be made therein without departing from the spirit and scope of the following claims.

I claim:

1. A bar code reader, comprising:
    means for generating a laser beam;
    means for scanning said laser beam across a bar code in an area defined by a triangle having vertices at the point where said laser beam is directed toward said bar code, and on opposite sides of said bar code;
    detecting means for receiving laser light reflected from said bar code and generating an electrical signal indicative thereof, said detecting means comprising:
    a first detector, laterally disposed on one side of a line running from the bar code reader to a vertex of said triangle, for receiving laser light reflected from said bar code and generating a first electrical signal corresponding to a first amount of laser light received, and
    a second detector, laterally disposed on an opposite side of said line, for receiving laser light reflected from said bar code and generating a second electrical signal corresponding to a second amount of laser light received; and
    identification means for identifying, from one of said first electrical signal and said second electrical signal, information encoded in said bar code such that said one of said first electrical signal and said second electrical signal corresponds only to one of said first amount and said second amount which does not comprise specularly reflected laser light.

2. The bar code reader of claim 1, wherein said detectors are equidistant from said line.

3. The bar code reader of claim 1, wherein said scanning means further includes a rotating polygonal mirror.

4. The bar code reader of claim 1, wherein said detecting means further includes a first lens for guiding reflected laser light to said first detector, and a second lens for guiding reflected laser light to said second detector.

5. A bar code reader, comprising:
    means for generating a laser beam;
    means for scanning said laser beam across a bar code in an area defined by a triangle having vertices at the point where said laser beam is directed toward said bar code, and on opposite sides of said bar code;
    detecting means for receiving laser light reflected from said bar code and generating an electrical signal indicative thereof, said detecting means comprising:
    a first detector, laterally disposed on one side of a line running from the bar code reader to a vertex of said triangle, for receiving laser light reflected from said bar code and generating a first electrical signal corresponding to a first amount of laser light received, and
    a second detector, laterally disposed on an opposite side of said line, for receiving laser light reflected from said bar code and generating a second electrical signal corresponding to a second amount of laser light received;
    identification means for identifying, from one of said first electrical signal and said second electrical signal, information encoded in said bar code such that said one of said first electrical signal and said second electrical signal corresponds only to one of said first amount and said second amount which does not comprise specularly reflected laser light; and
    switching means for selectively inputting one of said first electrical signal and said second electrical signal to said identification means.

6. A bar code reader as in claim 5, wherein said scanning means further includes a rotating polygonal mirror.

7. A bar code reader as in claim 5, wherein said detecting means further includes a first lens for guiding reflected laser light to said first detector, and a second lens for guiding said reflected laser light to said second detector.

* * * * *